United States Patent [19]

Quame

[11] 4,398,998
[45] Aug. 16, 1983

[54] APPARATUS FOR RECOVERING ENERGY AND USEFUL PRODUCTS FROM PLANTAIN WASTES

[76] Inventor: Babington A. Quame, 331 E. 29th St., New York, N.Y. 10016

[21] Appl. No.: 350,294

[22] Filed: Feb. 19, 1982

[51] Int. Cl.³ .......................... B09B 3/00; C10C 5/00; F23B 1/14; F23G 9/00

[52] U.S. Cl. .................................... 202/94; 110/234; 110/256; 110/259; 122/2; 201/25; 201/28; 202/106; 202/118; 422/187; 422/189; 422/193

[58] Field of Search ..................... 202/87, 94, 99, 106, 202/117, 118, 214, 215, 265; 201/25, 28, 33; 122/2; 110/234, 235, 256, 259; 422/187, 189, 193

[56] References Cited

U.S. PATENT DOCUMENTS

| | | | |
|---|---|---|---|
| 3,311,090 | 3/1967 | Lee | 122/2 |
| 3,346,481 | 10/1967 | Johnsen | 201/28 |
| 4,210,491 | 7/1980 | Schulman | 201/25 |
| 4,235,174 | 11/1980 | Spurrell | 110/234 |
| 4,287,838 | 9/1981 | Frosch | 110/234 |
| 4,346,661 | 8/1982 | Nakamura | 110/259 |

FOREIGN PATENT DOCUMENTS 679894 2/1964 Canada ................ 110/234

Primary Examiner—Bradley Garris
Attorney, Agent, or Firm—Steinberg & Raskin

[57] ABSTRACT

Energy and useful products are recovered from plantain wastes in a self-contained waste treatment plant wherein the raw material waste is charged into a boiler where the same is combusted to produce flue gases containing several organic compounds and dry ash containing residue mineral salts. The flue gas heats water in a water reservoir to generate steam which drives a turbine generator to produce electricity, the flue gas then being collected and at least partially condensed to form a pyroligneous acid solution from which alcohols and the like can be recovered. The dry ash containing residue mineral salt is mixed with other minerals or reagents with the resulting mass being supplied into a continuously stirred fusion furnace situated within the boiler to which heat is supplied by the flue gas to produce commercially useful products, such as zeolites, dolomite or other related products.

11 Claims, 4 Drawing Figures

APPARATUS FOR RECOVERING ENERGY AND USEFUL PRODUCTS FROM PLANTAIN WASTES

BACKGROUND OF THE INVENTION

This invention relates generally to methods and apparatus for recovering energy and useful products from waste material and, more particularly, to methods and apparatus for treating plantain and plantain waste, such as are found in Ghana, in a self-contained waste treatment plant for generating electricity and recovering carbonaceous organic substances, such as pyroligneous acids, as well as for forming compounds such as zeolites, dolomite and other related useful products.

Plantain is a large herbaceous plant with a short succulent stem sometimes attaining the height of twenty feet or more. This tropical tree-like herb grows in a natural state or can be cultivated. The plant is of great importance as it produces articles of food in the tropical climates. The name "plantain" varies from country to country but its basic ingredients are the same. In Ghana, several million acres of plantain farms are cultivated. This provides one of the most staple diets in the country. As a cultivated plant, each acre can be planted with 680 to 1435 suckers. These suckers require fifteen to eighteen months to reach the cutting stage. Each acre of a plantain farm can produce an average vegetable bunch weighing three tons. Out of this weight, only two tons are considered useful. After harvesting, the leaves, the porous sheaths of the trunk, the stock, and the vegetable peels weighing over twenty six tons per acre, are left in place to waste. Moreover, the fibers from the pseudostems of the plantain also constitute waste raw material.

SUMMARY OF THE INVENTION

It is an object of the present invention to provide a new and improved method and apparatus for recovering energy and useful products from plants, such as plantain.

It is another object of the present invention to provide a new and improved method and apparatus for treating plantain and plantain waste in a self-contained waste treatment plant for generating electricity and recovering carbonaceous organic substances, such as pyroligneous acids, as well as for forming compounds such as zeolites, dolomite, and other related useful products.

Briefly, in accordance with the apparatus of the present invention, these and other objects are attained by providing a self-contained treatment plant constituted by a boiler comprising a housing having a hot flame burner situated over an apertured plate in the bottom region thereof. A continuous stirred fusion furnace is situated within the housing vertically above the burner and a steam generator constituted by a water tank communicating with a steam pressure tank, is situated within the housing over the fusion furnace. A conveyor device is provided beneath the apertured plate and a gas discharge opening is formed in the housing at the upper end thereof.

According to the method of the invention, the waste raw material is fed into the housing through an inlet opening formed therein whereupon the material falls under gravity into the region of the hot flame burner where it is combusted in a vigorous manner to produce hot flue gases which rise within the housing and dry ash which falls onto the apertured plate. A rotary stirrer rakes the burning mass to facilitate combustion and passage of the ash through the apertures in the plate onto the conveyor for collection. The burner is preferably used only to initiate combustion of the waste material so that the burner is deactivated after ignition. Combustion of the waste raw material is continued by supplying a flow of oxygen onto the burning mass.

As the flue gases rise within the housing, the same pass over the water tank of the steam generator transferring heat energy to the water contained therein to an extent sufficient to generate steam which is then directed to a steam turbine for generating electricity which may be used for any desired purpose.

Meanwhile, the residue oxides and mineral salts obtained from the dry ash are mixed thoroughly with suitable mineral or reagents and the mixed mass fed into the continuously stirred heat fusion furnace. While rising in the housing, the flue gases also pass over the fusion furnace transferring heat to the stirred mass whereupon fusion temperature compounds, such as zeolites, dolomite, and other related products are formed.

Finally, the flue gases are collected and directed through the gas discharge opening at the upper end of the housing whereupon the gases are condensed and carbonaceous organic substances, such as pyroligneous acids, are recovered.

DESCRIPTION OF THE DRAWINGS

A more complete appreciation of the present invention and many of the attendant advantages thereof will be readily appreciated as the same becomes better understood by reference to the following detail description when considered in conjunction with the accompanying drawings in which.

DESCRIPTION OF THE PREFERRED EMBODIMENTS

Figure 1:
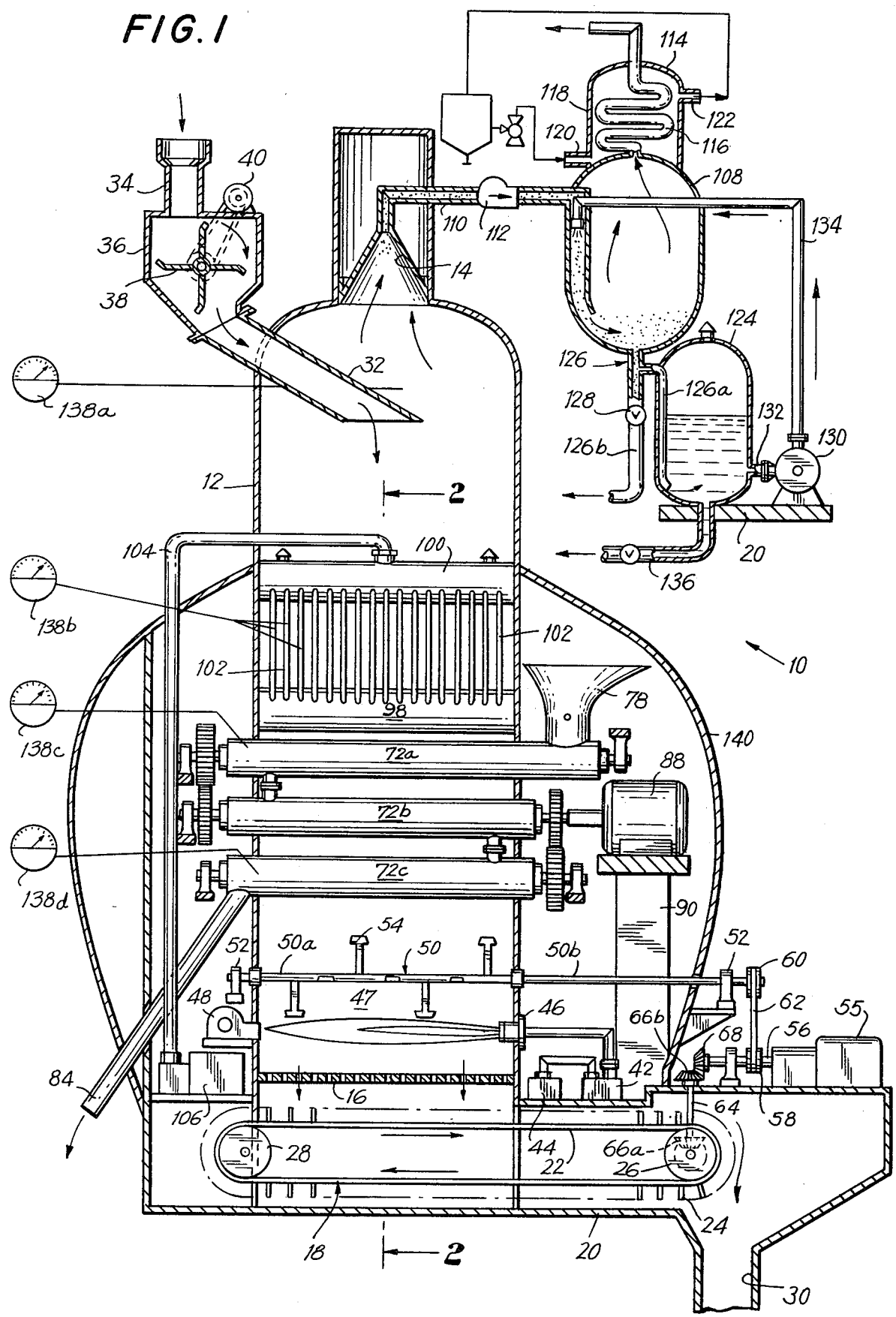
FIG. 1 is an elevation view in section of a self-contained waste treatment plant illustrating apparatus according to the present invention for performing the method of the present invention.
Figure 2:
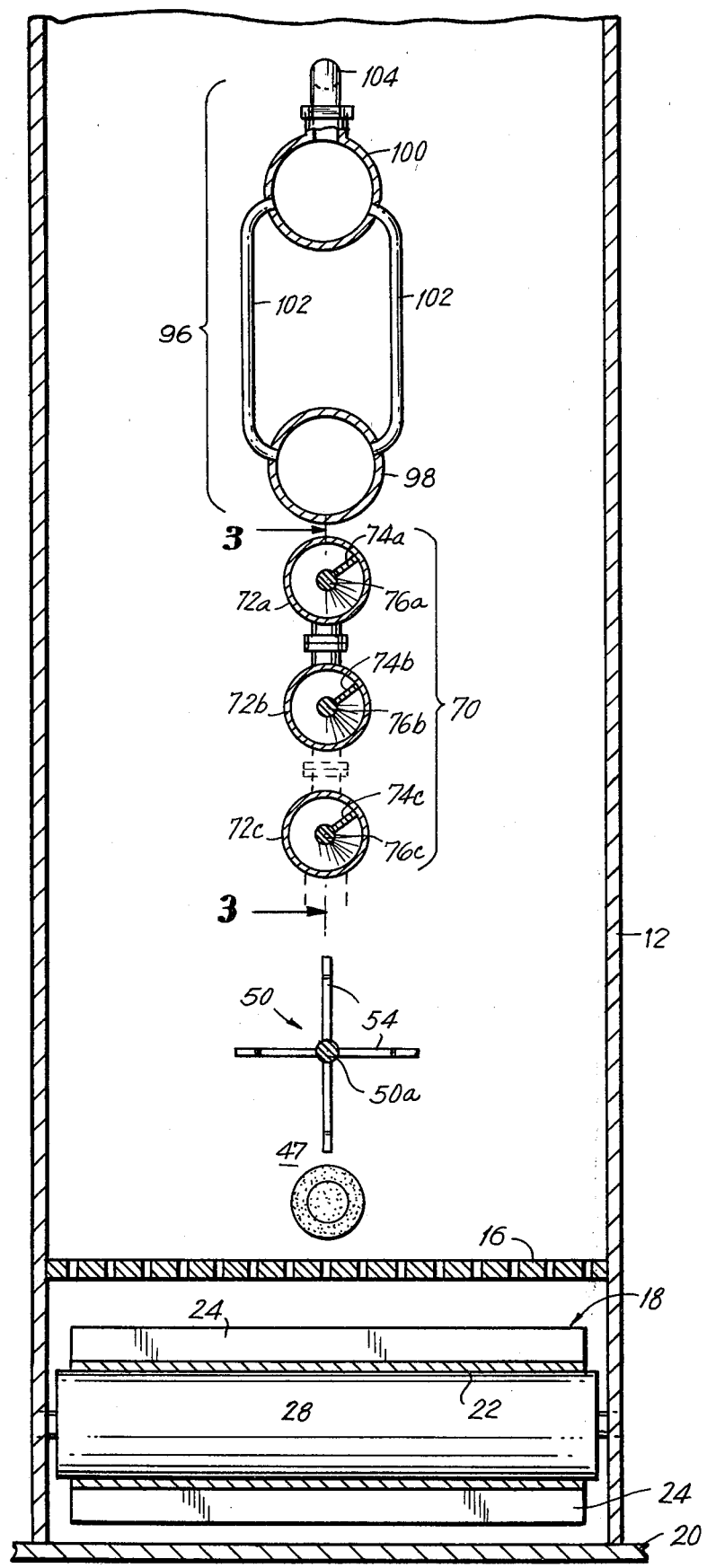
FIG. 2 is a section view taken along line 2—2 of FIG. 1.

Referring now to the drawings wherein like reference characters designate identical or corresponding parts throughout the several views, and more particularly to FIGS. 1 and 2 thereof, a self-contained waste treatment plant according to the apparatus of the present invention, generally designated 10, is illustrated. The waste treatment plant 10 includes a generally cylindrical housing 12 having a funnel-shaped gas discharge opening 14 provided at its top end within a cylindrical top cap structure. An apertured plate 16 extends across the interior of the housing 12 near its bottom end.

A portion of the upper run of an endless conveyor 18 passes directly beneath apertured plate 16. The conveyor 18 is mounted on a frame structure 20 and comprises a belt 22 with which pushers 24 are associated, the belt 22 being guided by a drive roller 26 and an idle roller 28. The frame structure 20 is formed with a discharge chute 30 situated beneath one end of conveyor 18.

An inlet chute 32 extends into the interior of housing 12 at its top end. The chute 32 communicates with a hopper 34 and between the chute and hopper is a chamber 36 in which a feed wheel 38 is rotatably mounted adapted to be driven by a variable speed motor 40.

A torch 42 is connected to an air compressor 44 and includes a nozzle 46 which is fixed within the wall of housing 12. During operation of the apparatus as described below, the torch 42 is adjusted to provide a hot, e.g., blue-greenish, flame in the lower burning region 47 of housing 12 above the apertured plate 16. Moreover, in order to conserve the consumption of oil or like fuel by the torch 42, an air blower 48 is fixed in the wall of housing 12, preferably in opposed relationship to nozzle 46. As described below in the operation of the plant, the combustion of the raw material waste is initiated by the torch flame whereupon the latter is deactivated and the combustion continued by the oxygen supplied by blower 48.

A stirrer device is provided which includes a shaft 50 rotatably mounted in bearings 52. The shaft 50 has a first portion 50a which extends through the lower region 47 of housing 12 and an extension portion 50b extending outside of the housing 12. Radially extending tines 54 extend from shaft portion 50a.

The stirrer shaft 50 is adapted to be rotated by means of a timed gear motor 55. Motor 55 has a shaft 56 to which a pulley 58 is affixed. A pulley 60 is fixed to the end of stirrer shaft extension portion 50b and a belt 62 is trained over pulleys 58 and 60. The drive roller 26 of conveyor 18 is preferably also driven by motor 55 through a shaft 64 by bevel gears 66a and 66b, the former meshing with a toothed wheel associated with roller 26 and the latter meshing with a bevel gear 68 fixed to motor shaft 56. In this manner, both the conveyor 18 and the stirrer shaft 50 will be moved at corresponding speeds.

Figure 3:
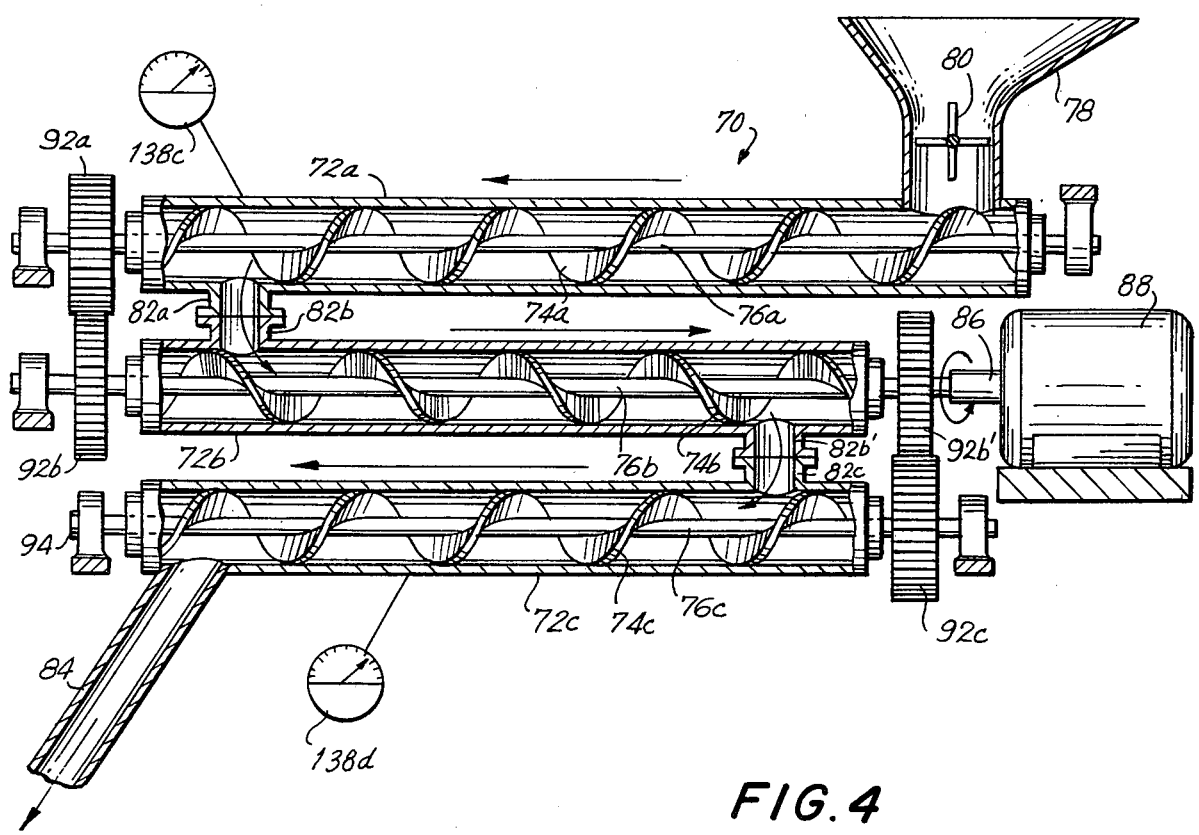
FIG. 3 is an elevation view in section of the fusion furnace constituting a component of the apparatus of the present invention.

Referring to FIG. 3 in conjunction with FIGS. 1 and 2, a stirrer furnace, generally designated 70, extends through the interior of housing 12 in a region situated above the stirrer device and above the firing area 47. The stirrer furnace 70 in the illustrated embodiment is constituted by three parallel, horizontally extending cylindrical chambers 72a, 72b and 72c formed of a good heat transfer material, the chambers being situated vertically one above the other and fixed in the wall of housing 12.

Each chamber has a respective screw mechanism 74a, 74b and 74c extending longitudinally therethrough, the screw mechanisms being fixed on respective shafts 76a, 76b and 76c mounted in bearings for rotation therewith. A feed hopper 78 in which a feed wheel 80 is provided communicates with an inlet end of upper chamber 72a. The outlet end of the upper chamber 72a communicates with an inlet end of intermediate chamber 72b through aligned collars 82a and 82b. Similarly, the outlet end of intermediate chamber 72b communicates with an inlet end of lower chamber 72c through aligned collars 82b and 82c. A discharge chute 84 communicates with the outlet end of the lower chamber 72c. The screw mechanisms 74 are rotated in appropriate directions so as to feed material contained in the respective chambers 72 from the inlet ends to the outlet ends thereof. In this connection, shaft 76b is directly connected to the shaft 86 of a heavy duty geared motor 88 mounted on a stand 90 fixed to frame structure 20 for rotation in the same direction therewith. Shafts 76a and 76c have gears 92a and 92c fixed thereto which engage gears 92b and 92b', respectively, fixed to shaft 76b, such that rotation of shaft 76b by motor 88 will result in shafts 76a and 76c rotating in opposite directions. An air inlet 94 is provided at the end of chamber 72c through which hot air can be directed into the stirrer furnace to stabilize the temperature of the material.

Referring again to FIGS. 1 and 2, a steam generator, generally designated 96, extends through the interior of housing 12 in a region situated above the sirrer furnace 70 and above the firing area 47. The steam generator 96 in the illustrated embodiment is constituted by a water reservoir tank 98 formed of a good heat transfer material and a steam pressure tank 100, the water reservoir and steam pressure tanks being connected by a plurality of small diameter pipes 102. The steam pressure tank is provided with conventional safety equipment for preventing the pressure therein from exceeding a predetermined maximum. The steam pressure tank 100 of the steam generator 96 is connected via a pipe 104 to a conventional steam turbine generator 106 mounted on frame 20 so that the steam will be directed under pressure into generator 106 whereby electricity is generated during operation for any desired purpose as described below.

The discharge opening 14 provided at the upper end of housing 12 communicates with a collector chamber 108 through a duct 110 in which a blower 112 is inserted. A condenser 114 is situated over chamber 108 and includes a serpentine pipe or coil 116 located within a water jacket housing 118 having a water inlet 120 and a water outlet 122 communicating with a water reservoir and pump as shown. The bottom of chamber 108 is communicated with a collector tank 124 by a pipe 126, one branch 126a of which enters into the tank 124, and another branch 126b of which is opened to the atmosphere. A valve 128 is located below the junction of pipe branches 126a and 126b and the latter are configured such that when valve 128 is closed, the entire liquid contents of collector chamber 108 will be discharged into collector tank 124. A centrifugal pump 130 communicates with the interior of tank 124 through a fitting 132 and with the collector chamber 108 through a pipe 134. A discharge pipe 136 in which a valve is provided communicates with the bottom of collector tank 124. All of the above-described apparatus is preferably mounted on the frame structure 20 as schematically shown in FIG. 1.

Temperature gauges 138a, 138b, 138c and 138d are provided to monitor the temperature of the flue gases entering discharge opening 14, of the steam in pipes 102, and of the material in stirrer furnace chambers 72a and 72c.

Moreover, an outer asbestos coated lining 140 is provided around the housing 12 in order to protect the operators from the heat generated therewith.

In operation according to the method of the present invention, the waste raw material from plantain or other plants is charged into the hopper 34 and fed by means of feed wheel 38 through inlet chute 32 into the housing 12. The raw material falls within housing 12 under gravity into the lower region or firing area 47 of housing 12. Combustion of the waste raw material is initiated by the torch 42, the intense flame emanating from nozzle 46 thereof starting a vigorous combustion of the mass in the housing to produce hot flue gases and dry ash. The hot flue gases rise within housing 12 while the dry ash falls onto the apertured plate 16.

As noted above, in order to conserve the consumption of oil by the torch 42, air blower 48 is provided. Thus, as soon as the combustion of the waste raw material has been initiated, the torch 42 is deactivated and the combustion of the burning mass continued by virtue of the air blower 48 supplying oxygen to the burning mass. It is therefor seen that the primary purpose of torch 42 is to initiate combustion of the raw waste material.

As the mass of raw waste material burns, the stirrer shaft 50 is rotated by the motor 55. In this manner, the burning mass is stirred thereby increasing the efficiency of the combustion. At the same time, the dry ash produced during combustion will be raked over the apertured plate 16 so that the ash falls through the apertures formed therein to the upper run of the belt 22 of conveyor 18.

Figure 4:
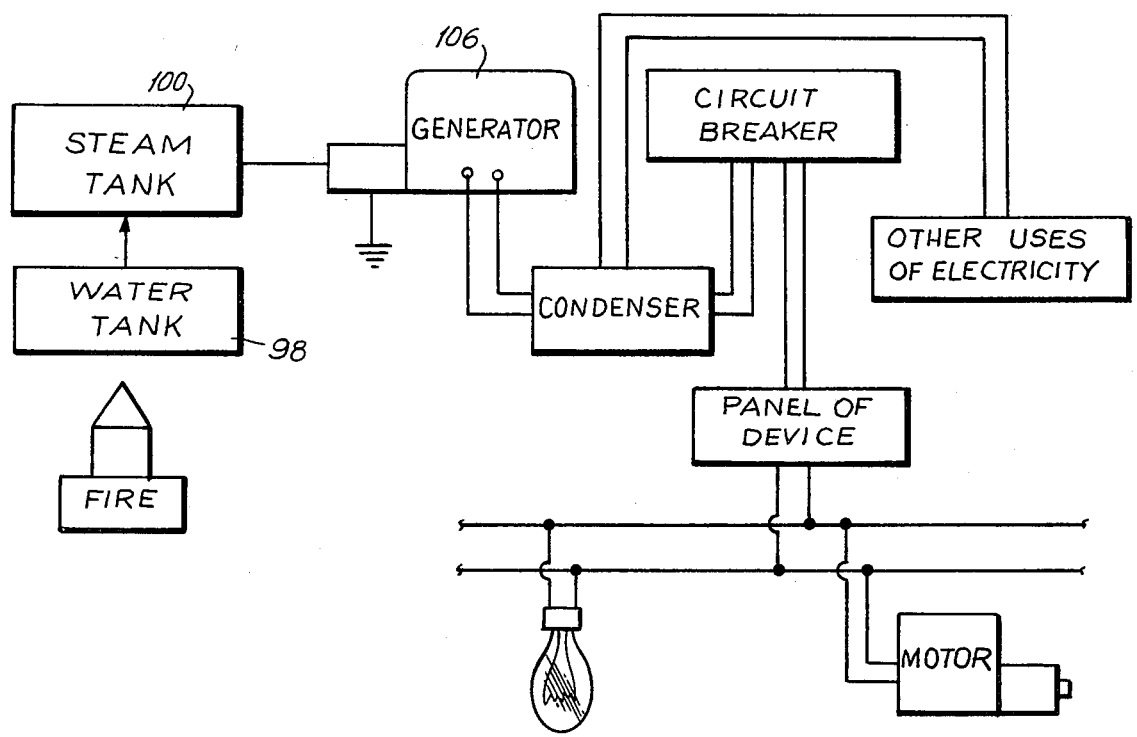
FIG. 4 is a diagramatic illustration of the components of the steam generator and turbine generator constituting components of the apparatus of the present invention and associated with various equipment.

Since the water reservoir 98 of the steam generator 96 is located vertically above the firing area 47 of the boiler, the flue gases which will have a temperature of between 300° and 400° Fahrenheit, will transfer heat to the water contained within the reservoir 98 so that a constant flow of live steam is supplied through the plurality of small diameter pipes 102 which connect the water reservoir 98 to the steam pressure tank 100. The steam so generated is directed through pipe 104 to the steam turbine generator 106. Referring to FIG. 4, it is seen that the electricity produced by generator 106 can be used to supply energy to various type of equipment.

The flue gases which will contain several organic compounds from the raw material are collected and directed through the discharge opening 14 at the upper end of housing 12 and through duct 110 into collector chamber 108. The gases rise as indicated by the arrows in FIG. 1 and enter into the coil 116 of condenser 114 which is cooled by water circulating through water jacket housing 118 through the inlet and outlet 120 and 122. The gas discharged from the upper end of coil 116 is collected for recovery.

The condensate on the other hand enters into the pipe 126 and with valve 128 closed is then charged into the collector tank 124 through pipe branch 126a. This condensate constitutes a pyroligneous acid solution from which various useful products such as alcohols, acidic acid, acetone, furfural, and other related products, can be recovered. The condensed pyroligneous acid solution tank may be recirculated into the collector chamber 108 by means of centrifugal pump 130 through pipe 134.

Meanwhile, the dry ash which has been collected on the upper run of the belt 22 of conveyor 18 is discharged through the discharge chute 30. This dry ash which contains residue mineral salt is thoroughly mixed with other minerals or reagents and the mixed mass elevated by any suitable means and charged into the feed hopper 78 of the stirrer furnace 70. By virtue of the rotation of the various screw mechanisms 74, the mixed mass travels through upper chamber 72a from which it enters into the intermediate chamber 72b where it travels over the length thereof and is directed into the lower chamber 72c through which it travels to discharge chute 84. As noted above, the screw mechanisms 74 constituting a part of the stirrer furnace 70 are driven by means of motor 88 at a speed which is synchronized with the speed of the conveyor 18.

As the mixed mass of material flows through the stirrer furnace 70, the hot flue gases pass over the exterior of the chambers 72 thereby transferring heat energy to the mixed mass of material flowing therethrough. In this manner, a heat exchange carbonization occurs and when the respective fusion temperatures are reached, products such as zeolites or dolomite and related products are produced. The finished product is of course discharged from the discharge chute 84.

It is seen from the foregoing that a self-contained waste treatment plant is provided whereby waste raw material from plants, such as plantain, are treated for generating steam, such as for rural electrification, for recovering carbonaceous organic substances such as pyroligneous acids, and for treating the residue mineral salts and oxides obtained from the dry ash for obtaining compounds such as zeolites, dolomite and other commercially useful products.

Obviously, numerous modifications and variations of the present invention are possible in the light of the above teachings. It is therefore to be understood that within the scope of claims appended hereto, the invention may be practiced otherwise than as specifically disclosed herein.

What is claimed is:

1. Apparatus for recovering energy and useful products from waste raw material comprising:
   a housing having a burner provided at a lower firing region thereof and a gas discharge opening at an upper region thereof;
   a furnace disparate from but situated within said housing in the path of flue gas generated at said firing region, said furnace including an inlet region adapted to receive a mass of mixed material, an outlet region, and means for stirring the mass of mixed material as the same is transported from said inlet region to said outlet region thereof, said flue gas transferring heat to the mass of mixed material received within said furnace to form useful compounds;
   means for transferring solid residue from said firing region of said housing to said inlet region of said furnace as a component of said mixed material;
   means for generating steam situated within said housing, said steam generating means being located in the path of flue gas generated at said firing region, said steam generating means including a water reservoir, and said flue gas transferring heat to the water contained within said reservoir to generate steam useful for producing energy; and
   means for condensing the flue gas generated at said firing region and for recovering any remaining flue gas.

2. The combination of claim 1 further including means situated within said firing region of said housing for stirring a burning mass of waste raw material to facilitate combustion thereof.

3. The combination of claim 1 wherein an apertured plate is situated within said housing beneath said firing region onto which a solid residue of combustion is adapted to fall.

4. The combination of claim 1 further including means situated beneath said firing region for conveying a solid residue of combustion to a discharge point.

5. The combination of claim 1 wherein said furnace comprises a plurality of chambers situated one above the other in communication with each other, said chambers being in the path of flue gas generated at said firing region.

6. The combination of claim 5 wherein said chambers each have a rotating screw mechanism provided in its interior.

7. The combination of claim 6 wherein said furnace comprises an upper chamber, a lower chamber and an intermediate chamber, said upper chamber having an inlet opening formed therein for receiving a mass of mixed material and said lower chamber having an outlet opening formed therein through which material in said furnace is discharged therefrom.

8. The combination of claim 1 wherein said steam generating means includes a water tank constituting said water reservoir, a pressure steam tank located above said water tank, and a plurality of tubes fluidly interconnecting said water and pressure steam tanks.

9. The combination of claim 1 wherein said flue gas condensing means comprises a condenser coil in fluid communication with said gas discharge opening, a coolant jacket surrounding said condenser coil, and a condensate collecting tank.

10. The combination of claim 1 further including a steam turbine generator in fluid communication with said steam generating means whereby steam generated by said steam generating means is directed under pressure to said steam turbine generator for driving the same.

11. The combination of claim 1 further including air blower means for supplying oxygen into said firing region of said housing.

* * * * *